United States Patent [19]
Kawahara

[11] 3,980,870
[45] Sept. 14, 1976

[54] DEVICE FOR MEASURING CONTOUR LENGTH OF A TWO-DIMENSIONAL PATTERN

[75] Inventor: Atsushi Kawahara, Yokohawa, Japan

[73] Assignee: Nippon Kogaku K.K., Tokyo, Japan

[22] Filed: May 8, 1975

[21] Appl. No.: 575,718

[30] Foreign Application Priority Data
May 14, 1974 Japan.............................. 49-52861

[52] U.S. Cl...................... 235/151.3; 178/DIG. 36; 178/6.8; 340/146.3 AC
[51] Int. Cl.² .................... G01B 11/00; G06K 9/10
[58] Field of Search........ 235/151.3, 151.31, 92 PC; 178/DIG. 22, DIG. 36, 6.8; 356/167; 340/146.3 AC, 146.3 AE

[56] References Cited
UNITED STATES PATENTS

| | | | |
|---|---|---|---|
| 3,216,311 | 11/1965 | Bibbero et al. .............. | 178/DIG. 36 |
| 3,639,903 | 2/1972 | Nashljunas et al. ........ | 340/146.3 AC |
| 3,733,434 | 5/1973 | Weinstein ............................ | 178/6.8 |
| 3,832,687 | 8/1974 | Miller et al............ | 340/146.3 AC X |
| 3,854,822 | 12/1974 | Altman et al................ | 178/DIG. 36 |

Primary Examiner—Joseph F. Ruggiero
Attorney, Agent, or Firm—Fitzpatrick, Cella, Harper & Scinto

[57] ABSTRACT

A device for measuring the contour length of a two-dimensional pattern comprises means for scanning the pattern and sampling each scanned line at a predetermined length to convert the pattern into digitally coded patterns. A rotary means rotates the two-dimensional pattern relative to the converting means to attain uniform spatial distribution of the two-dimensional pattern. A discriminating means discriminates that the digital coded patterns corresponding to the contour line segments placed between the neighboring scanning lines correspond to the number of times the length of the sample to classify the segments into a number of groups according to the result of the discrimination. A computer multiplies the outputs from the classifying means by predetermined weighting coefficients, respectively, at each rotated position of said two-dimensional pattern to obtain the average of the contour length of the two-dimensional pattern at every rotated position.

4 Claims, 21 Drawing Figures

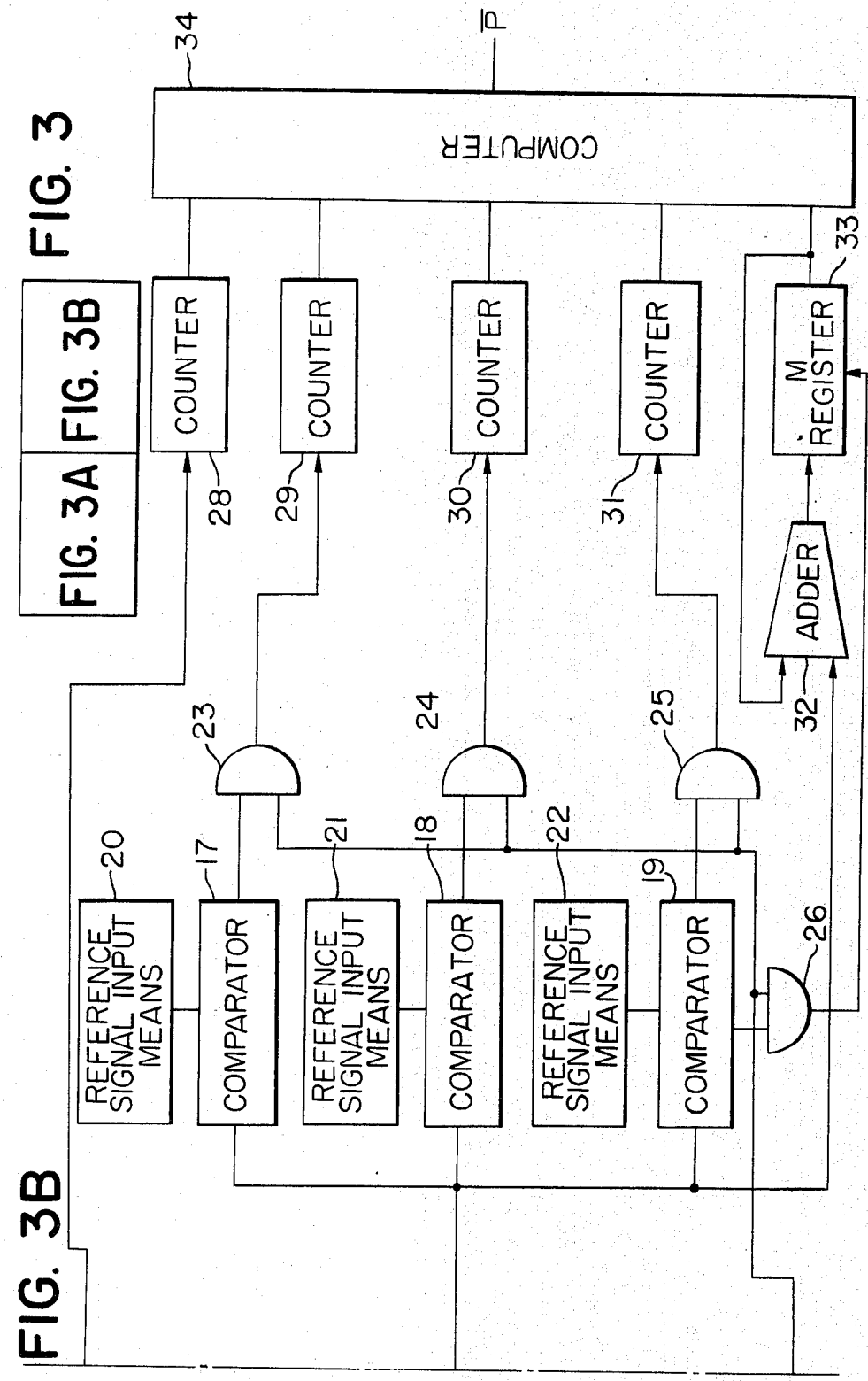

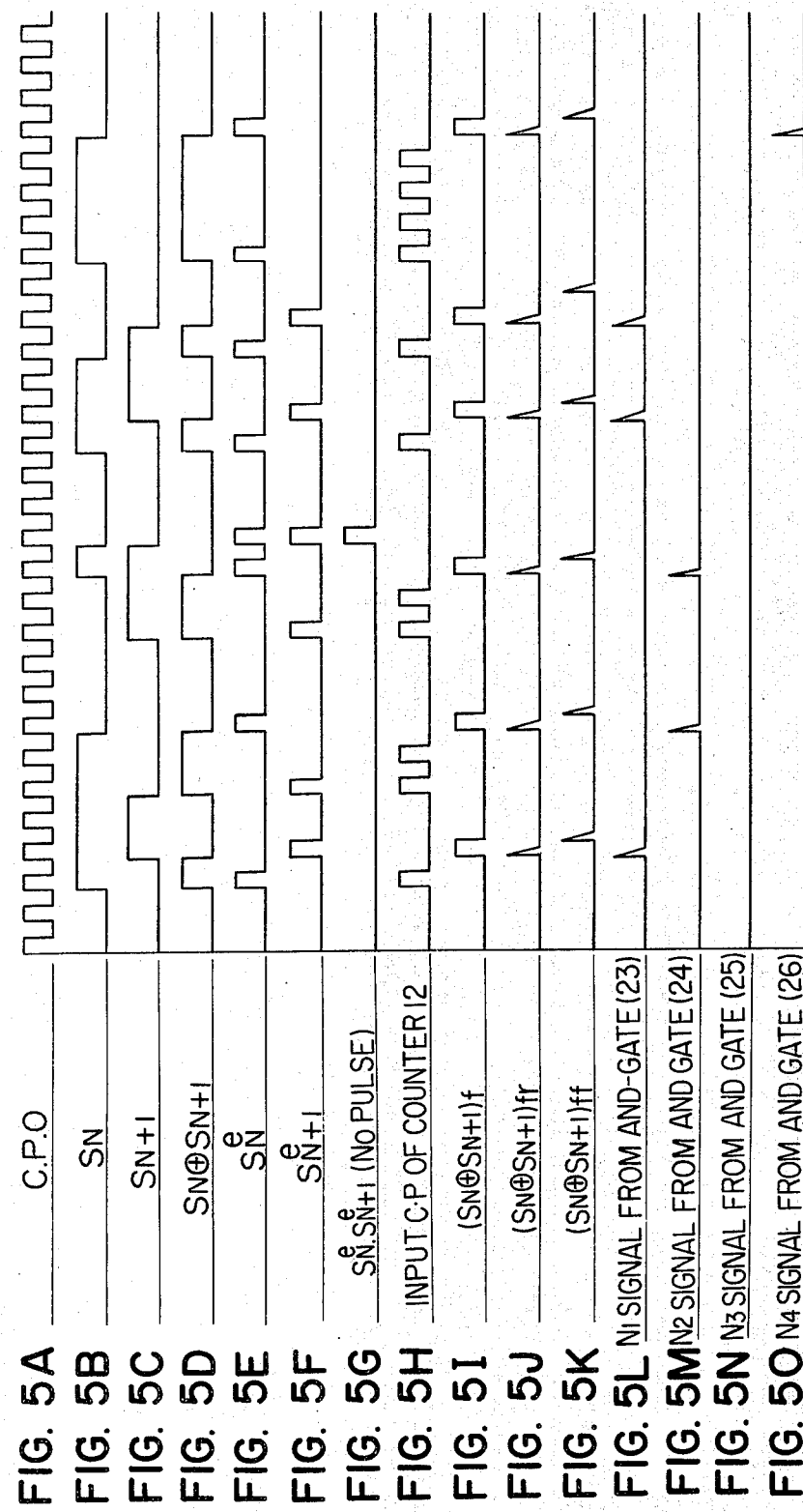

DEVICE FOR MEASURING CONTOUR LENGTH OF A TWO-DIMENSIONAL PATTERN

BACKGROUND OF THE INVENTION

1. Field of the Invention

This invention relates to a device for measuring the contour length of a two-dimensional pattern.

2. Description of the Prior Art

Measurement of the length of the contour (to be referred to in this specification as "contour length") of a two-dimensional pattern is required in various fields. In general, it has been known that the contour length of a pattern is largely dependent not only upon the size of the pattern, but also upon the complexity of the pattern itself. There has already been devised and demonstrated a method for measuring the contour length of a pattern wherein the pattern is converted or encoded into a digitally coded pattern consisting of binary digits 0's and 1's, and the contour length is measured based upon the assumption that the number of picture elements including the boundary line of the pattern is in proportion to the contour length.

There has also been proposed another method for making contour length measurements in which the contour or boundary line is approximated by a large number of polygons.

In both of the foregoing methods, the continuous contour or boundary line is approximated by the digital or discrete line segments or patterns so that accurate measurement of the contour length is impossible.

SUMMARY OF THE INVENTION

I have conceived and contribute by the present invention a device for measuring the contour length of a two-dimensional pattern by which I am able to overcome the foregoing difficulties and to effect the desired measurements with a higher degree of accuracy than was possible by either of the aforementioned methods.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein:

FIG. 3 including FIGS. 3A and 3B, is a block diagram of one preferred embodiment of a device for measuring the contour length of a two-dimensional pattern in accordance with the present invention;

FIGS. 5(A) to 5(O) illustrate various signals produced in the device shown in FIG. 3.

DESCRIPTION OF THE PREFERRED EMBODIMENTS

Figure 1:
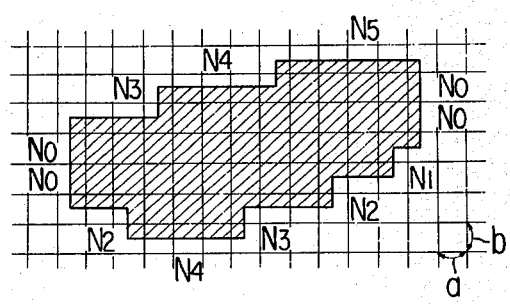
FIG. 1 shows a two-dimensional pattern sampled and quantized according to the underlying principle of the present invention.

Prior to the description of one preferred embodiment of the present invention, the underlying principle of the present invention will be described. In order to sample and quantize a two-dimensional pattern, that is, to convert or encode the pattern into a binary coded pattern, the pattern is scanned along scanning lines equally spaced apart from each other by a distance $b$ as shown in FIG. 1, and is sampled by the lines which are also equally spaced apart from each other by a distance $a$. Therefore, the contour or boundary line may be deemed to consist of a large number of contour line segments divided by the scanning lines and interposed between the two adjacent scanning lines. Each line segment thus sampled and quantized, is projected upon the adjacent scanning line and the projected length of the line segment is further sampled and guantized. Therefore, the digitally sampled length of the line segment projected is equal to an integral multiple of the sampling interval $a$; that is, $i \times a$ where $i = 0,1,2, \ldots$ ... As shown in FIG. 1, the pattern now consists of a large number of rectangular picture elements with sides $a$ and $b$. Therefore, the contour length of the pattern may be expressed by the sum of the length of the outlines of the picture elements whose horizontal side is equal to $i \times a$ and whose vertical side is equal to $b$. Let N0 denote the contour line segment which is divided by the adjacent horizontal scanning lines between the adjacent vertical lines. Let N1 denote the contour line segment interposed between the adjacent horizontal scanning lines and intersecting only one vertical line. That is, the N1 contour line segment has its one end positioned in one of the horizontally adjacent picture elements and its other end in the other picture element. In a similar manner, N2, N3, . . . , and Ni may be defined. The sorting or classification of the contour line segments into N0, N1, N2, . . . and Ni may be accomplished by merely comparing the two adjacent scanning lines as will be described in detail hereinafter. However, it will be appreciated that not only is the sampling and quantizing of a two-dimensional pattern anisotropic, but also the two-dimensional pattern to be measured is in general anisotropic. Therefore, it is impossible to measure with a higher degree of accuracy, the contour length of a two-dimensional pattern. However, when a pattern is spatically isotropic and has randomness to be defined hereinafter, accurate measurement of the pattern becomes feasible. To this end, according to the present invention, a pattern is rotated through a predetermined angle from one angular position to another, so that the isotropy of the pattern may be artificially produced. When the radius of curvature of the contour of a pattern is sufficiently larger than the sides of the picture elements so that the contour characteristic may not be lost, the contour may be approximated with a sufficient degree of accuracy by the contour line segments. If the contour is random, the contour line segments may be classified or sorted into N0, N1, N2, ..., and Ni, and the contour length may be obtained in a manner to be described in detail hereinafter. In this specification, when I refer to the fact that the contour is random, I mean that the ends of contour line segments are uniformly distributed both in position and direction. Therefore, if the contour is random, the average length $\overline{Li}$ of the Ni contour line segments may be expressed as follows:

$$\overline{Li} = \int_o^a \overline{li}(x) \cdot \theta i(x) \, dx \Big/ \int_o^a \theta i(x) \, dx \qquad (1)$$

where $\theta i(x)$ denotes an angular range where the other end of a contour line segment exists when viewed from the position $(x)$ of one end of the contour line segment; and $li(x)$ denotes the average length of the contour line segment in the above angular range or distribution $\theta i(x)$, and is expressed by $$\overline{li}(x) = \frac{1}{\theta i(x)} \int_{\theta i_1(x)}^{\theta i_2(x)} \frac{b}{\cos \theta} \, d\theta \qquad (2)$$

where
$\theta i(x) = \theta i_2(x) - \theta i_1(x)$
$\theta i_1(x) = \arctan \{x + (i - 1)a/b\}$
$\theta i_2(x) = \arctan \{x + i\, a/b\}$ Therefore, the contour length P is expressed by $$\overline{P} = \sum_{i=0}^{\infty} \overline{Li} \cdot Ni$$

Table 1 shows $\overline{Li}$ when $a/b = 1.5$.

Table 1

| i | $\overline{Li}$ | $i.a/\overline{Li}$ |
|---|---|---|
| 0 | 1,1181 | 0 |
| 1 | 1,59132 | 0.942615 |
| 2 | 2,94787 | 1.01768 |
| 3 | 4.45349 | 1.01044 |
| 4 | 5.96421 | 1.006 |
| 5 | 7.4695 | 1.0040 |
| 6 | 8.97125 | 1.0032 |
| 7 | 10.495 | 1.00047 |
| 8 | 11.9768 | 1.00194 |
| 9 | 13.5485 | 0.996419 |
| 10 | 14.9758 | 1.00162 |

As seen from Table 1, when $i \geq 4$, $\overline{Li}$ may be approximated as equal to $i.a$ because the approximation error will be negligible in practice.

Using the angular variable $\phi$, the contour length P may be expressed $$P(\phi) = \sum_{i=0}^{3} \overline{Li} \cdot Ni(\phi) + a \cdot \sum_{i=4}^{\infty} i \cdot Ni(\phi) \qquad ①$$

This means that when the contour length of an anisotropic pattern is expressed by Eq. ① Ni is dependent upon the direction of the pattern, and is a function of the angle of rotation $\phi$. Therefore, the contour length P is expressed by $P(\phi)$.

When an anisotropic pattern is rotated continuously through a predetermined angle, $$\overline{Ni} = \frac{1}{\tau L} \sum_{j=0}^{k} Ni\left(j \cdot \frac{\tau L}{k}\right) \cdot \left(\frac{\tau L}{k}\right) \qquad ②$$

where $K = 180°/$an integer may be considered as a characteristic calculation value of an isotropic pattern obtained by a sort of normalization of rotating the pattern through a predetermined angle. In Eq. ②, the denominator is $\tau L$ because the projected length of the pattern contour remains unchanged or same when the pattern is rotated from 0 to $\tau L$ and from $\tau L$ to $2\tau L$.

Therefore, the contour length $\overline{P}$ obtained by the rotation of the pattern through a predetermined angle, may be expressed by:

$$\overline{P} = \frac{1}{\tau L} \sum_{j=0}^{k} P\left(j \cdot \frac{\tau L}{k}\right) \cdot \left(\frac{\tau L}{k}\right)$$

$$= \frac{1}{\tau L} \sum_{j=0}^{k} \left\{ \sum_{i=0}^{3} \overline{Li} \cdot Ni\left(j \cdot \frac{\tau L}{k}\right) + a \cdot \sum_{i=4}^{\infty} i \cdot Ni\left(j \cdot \frac{\tau L}{k}\right) \right\} \left(\frac{\tau L}{k}\right) \qquad (3)$$

Figure 2:
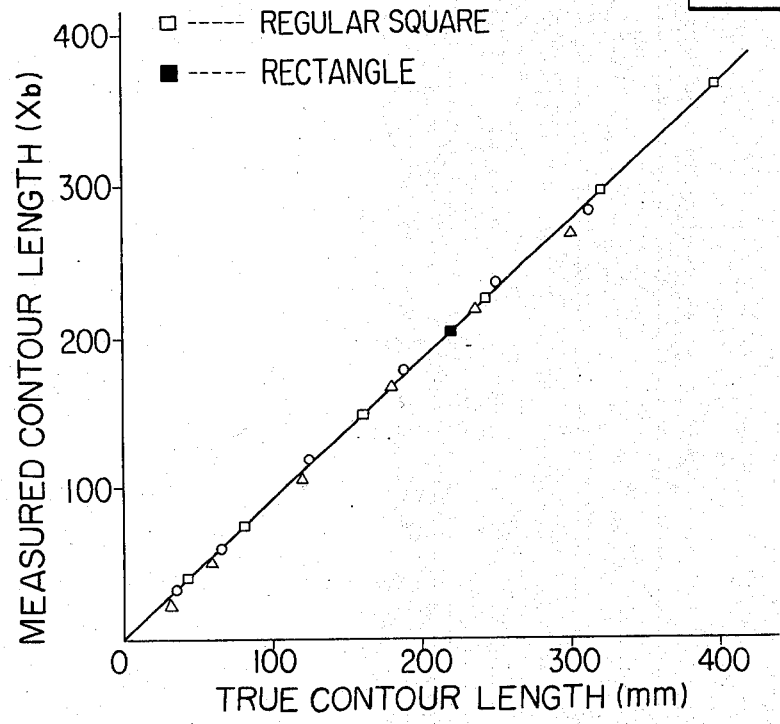
FIG. 2 shows the difference between the true contour length of various figures and the contour length measured by the device in accordance with the present invention.

FIG. 2 shows the difference between the true contour length of various figures such as circles, squares, regular triangles, rectangles, etc., and their measured contour length based upon the underlying principle of the present invention. From FIG. 2, it is seen that the error between the true and measured contour length is very small and that the relation between them is linear over a wide range.

Figure 4:
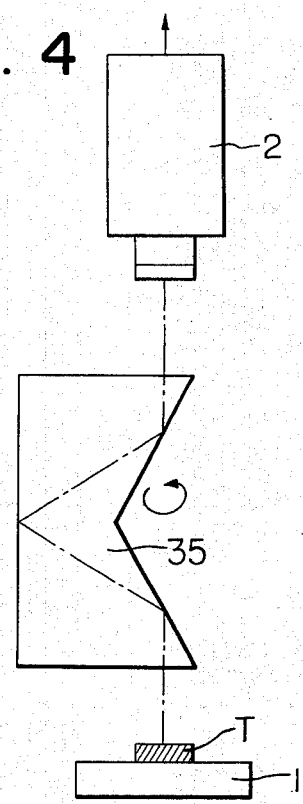
FIG. 4 is a view of an optical system for rotating a pattern.
Figure 3A:
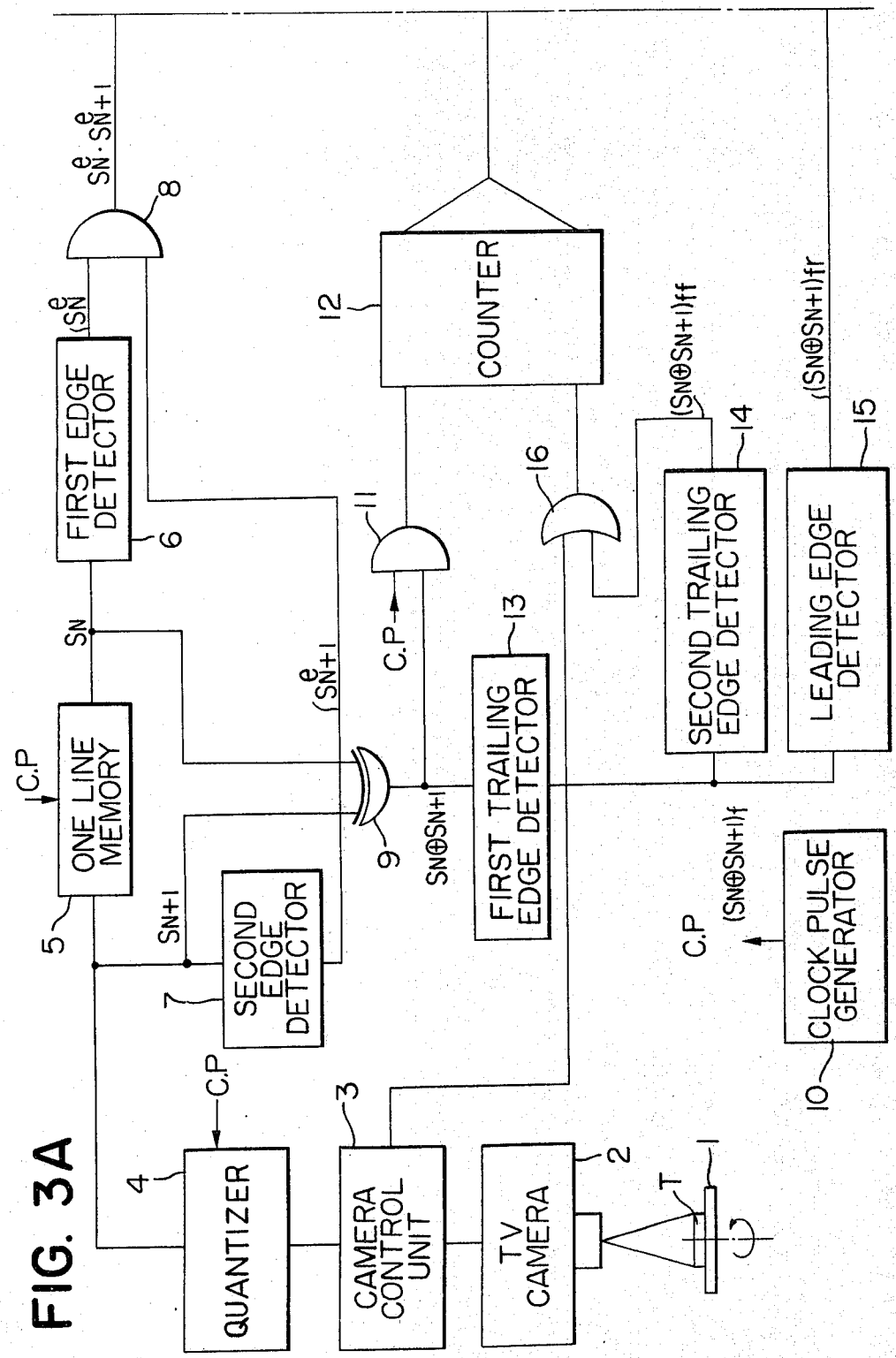

Next, referring to FIG. 3, one preferred embodiment of the present invention will be described. A pattern T is placed upon a rotary stage 1, but it is to be understood that any suitable optical means such as a prism 35 may be used to rotate the pattern T as shown in FIG. 4. In the instant embodiment, a video input device is a television camera 2 of the sequential scanning type. A camera control unit 3 generates the sync signals for the TV camera 2, and transmits the video signal from the TV camera 2 to a quantizer 4 in the next stage. The quantizer 4 comprises a high-speed analog-to-digital converter and a sampling circuit, and converts the video signals into the binary coded digital signals. The output from the quantizer 4 is applied to a one-line memory 5 so that the output therefrom may be delayed by the period of one scanning line. A first edge detector 6 detects the transition from 0 to 1 or 1 to 0 of the output $S_N$ from the one-line memory 5 thereby generating the signal $$S_N^e$$

with the pulse width equal to one half clock time. In like manner, a second edge detector 7 generates the signal $$S_{n+1}^e$$

in response to the output signal $S_{n+1}$ from the quantizer 4 which is not delayed. In response to the outputs from the first and second edge detectors 6 and 7, a first AND gate 8 generates No signal representative of the contour line segment with $i = 0$. When $i \neq 0$, in response to the signals $S_N$ and $S_{N+1}$, an EXCLUSIVE OR gate 9 produces $S_N \oplus S_{N+1}$. In cooperation with an AND gate 11 to which are applied clock pulses CP, a counter 12 detects the number of rectangular picture elements $i$ of the $S_N \oplus S_{N+1}$ signal. A trailing edge detector 13 detects the transition from 1 to 0 of the $S_N \oplus S_{N+1}$ signal, thereby generating $(S_N \oplus S_{N+1})_f$ signal. In response to the horizontal sync signal from the camera control unit 3 and the output from the first trailing edge detector 13, an OR gate 16 detects the transition from 1 to 0 of the $(S_N \oplus S_{N+1})_f$ signal, and a second trailing edge detector 14 generates the $(S_N \oplus S_{N+1})$ff signal. In response to the output from the OR gate 16, the counter 12 is reset. Digital comparators 17, 18, and 19 classify the contour line segments into N1, N2, N3 and those equal to or higher than N4, and input means 20, 21 and 22 apply the reference signals for classification to the comparators 17, 18 and 19, respectively. A leading edge detector 15 detects the transition from 0 to 1 of the $(S_N \oplus S_{N+1})f$ signal, thereby generating $(S_N \oplus S_{N+1})_{fr}$ signal. An adder 32 and an M register 33 make up an accumulator to which inputs are outputs from the counter 12 and from the M register, so that the M register stores the number of the contour line segments equal to or higher than N4 by adding the output from the counter 12 and the output from the M register which has been already accumulated. The M register 33 operates by an AND gate 26 which operates by an output from the comparator 19 which discriminates whether the output signals from the detector 15 and from the counter 12 are equal to or higher than N4. In a similar manner, and AND gate 23 is opened by the output signal from the comparator 17 and the output signal from the leading edge detector 15 so that the content of the counter 29 which counts the number of N1 included in the output signal from the counter 12, is increased. The output signals from the counter 12, corresponding to N2 and N3, are discriminated by the comparators 18 and 19, respectively, and increase the respective contents of the counters 30 and 31 with the output signal from the leading edge detector 15 in the same manner as above-mentioned. A counter 28 counts the output from the gate 8; that is, No. Thus, upon completion of scanning, the numbers of N0, N1, N2 and N3 contour line segments are stored in the counters 28, 29, 30 and 31, respectively, while the number of the contour line segments equal to or higher than N4; that is, $$M = \sum_{i=4}^{\infty} i \; .$$

Ni is stored in the register 33. This data is then transferred into a computer 34 in which Eq. (3) is programmed. Thus, the data are processed based upon the underlying principle of the present invention so that the contour length P may be obtained. At the start and end of the measurement at each predetermined angular position of the pattern T, the counters 28, 29, 30, 31 and 33 are reset in response to the clear signal from a clear signal generating circuit (not shown).

The timing of various signals generated in the instant embodiment, is shown in FIGS. 5(A) to 5(O). Clock pulses generated by a clock pulse generator 10 (see FIG. 3) are shown at (A). At (B) is shown the signal $S_N$; that is, the output from the one-line memory 5 which is delayed by one scanning period. At (C) is shown the signal $S_{N+1}$; that is, the output from the quantizer 4 representative of the digitally coded signal of the picture elements along the next scanning line. At (D) is shown the $(S_N \oplus S_{N+1})$; that is, the exclusive OR of the signals $S_N$ and $S_{N+1}$. At (E) is shown the signal $$S_N^e \; ;$$

that is, the output from the edge detector 6. At (F) is shown the signal $$S_{N+1}^e \; ;$$

the output from the detector 7. At (G) is shown the signal $$S_N^e \cdot S_{N+1}^e \; ;$$

that is, the output from the AND gate 8 representative of N0 detection. At (H) are shown the clock pulses applied to the counter 12 which are used to count the contour line segments equal to or higher than N1. At (I) is shown the $(S_N \oplus S_{N+1})_f$ signal; that is, the output from the detector 13 which detects the trailing edge of the $(S_N \oplus S_{N+1})$ signal. At (J) is shown the $(S_N \oplus S_{N+1})$ signal; that is, the output from the detector 15 which detects the leading edge of the $(S_N \oplus S_{N+1})_f$ signal. At (K) it is shown that the trailing edge of the $(S_N \oplus S_{N+1})_f$ signal is detected to generate the $(S_N \oplus S_{N+1})_{ff}$ signal. At (L), (M) and (N) are shown the N1, N2, and N3 signals used to increment the counters 29, 30 and 31, respectively, through the AND gates 23, 24 and 25. At (O) is shown a signal corresponding to an M signal which is produced by the AND gate 26 and to be accumulated in the adder 32 and M register 33.

As described hereinbefore, according to the present invention, the contour length of a two-dimensional pattern may be measured with a higher degree of accuracy hitherto unattainable by the prior art methods, and there may be provided a device for measuring the contour length of a two-dimensional pattern which may advantageously be used not only to quantative stereology, but also in other various fields. From the standpoint of the hardward, the device, in accordance with the present invention, is also very advantageous because there must be provided only a relatively small capacity memory capable of storing therein the signals only along one scanning line and because the data may be processed at a higher speed.

I believe that the construction and operation of my novel apparatus will now be understood and that the advantages thereof will be fully appreciated by those persons skilled in the art.

1 claim:

1. A device for measuring the contour length of a two-dimensional pattern comprising:
   a. means (2, 3, 4) for scanning the pattern and sampling each scanned line at a predetermined length to produce an output including pulses, thereby converting the pattern into digitally coded patterns;
   b. rotary means (1, 35) for intermittently rotating the pattern relative to said scanning means to enable said scanning means to scan and sample the pattern at each position of rotation, thereby attaining the uniform spatial distribution of the pattern;
   c. means (5, 6, 7, 8) for detecting coincidence of the pulse edge of the output from said scanning means when said scanning means samples one scanned line and the pulse edge of the output from said scanning means when it samples the scanned line adjacent to said one scanned line, to produce an output when said detecting means detects said coincidence;
   d. means (5, 9) for comparing the output from said scanning means when it samples said one scanned line with the output from said scanning means when it samples said adjacent scanned line, and for measuring the difference between said two outputs of said scanning means to produce an output involving digital information ($N_1, N_2 \ldots$) into which the contour line segment of said pattern interposed between said two adjacent scanned lines is quantized;
   e. means for discriminating that said digital information corresponds to a number of times ($N_1, N_2, \ldots$) as large as said predetermined length;
   f. first means for multiplying the output of said detecting means by a predetermined weighting coefficient ($L_0$);
   g. second means for multiplying the information of said comparing means by predetermined weighting coefficients according to the number of times (or the result of discrimination); and
   h. means for averaging the outputs of said first and second means to obtain the average of the contour length of the pattern at each position of rotation.

2. A device according to claim 1, wherein said scanning means repeats, in turn, linear scanning along a straight line traversing said pattern, the distance between said adjacent linear scans being constant.

3. A device according to claim 2, further comprising: a one-line memory of which an input terminal is connected to said scanning means and of which an output terminal is connected to said detecting means and to said comparing means, said one-line memory memorizing the output of said scanning means, which is produced when said scanning means samples one scanned line, until completion of sampling said one scanned line, said scanning means comparing the output of said one-line memory with the output of said scanning means.

4. A device according to claim 1, further comprising: means (17–25) for classifying the output of said comparing means according to the number of times; a plurality of counters (29–31) of which input terminals are connected to said classifying means and of which output terminals are connected to said second means for counting each of the classified outputs, the outputs of said counters being multiplied in said second means by said weighting coefficients corresponding to said counter, respectively.

* * * * *

UNITED STATES PATENT AND TRADEMARK OFFICE
CERTIFICATE OF CORRECTION

PATENT NO. : 3,980,870
DATED : September 14, 1976
INVENTOR(S) : ATSUSHI KAWAHARA It is certified that error appears in the above-identified patent and that said Letters Patent are hereby corrected as shown below:

Column 2, line 27, "guantized" to read --quantized--.
Column 5, lines 55 to 59, change the equation to read:

$$M = \sum_{i=4}^{\infty} i \cdot Ni$$

Column 5, line 60, delete "Ni".
Column 6, lines 20 to 24, change the equation to read:

$$\frac{S\ e}{N+1}$$

Column 7, line 36, before "as" delete the ")".

Signed and Sealed this

Fourth Day of January 1977

[SEAL]

Attest:

RUTH C. MASON
*Attesting Officer*

C. MARSHALL DANN
*Commissioner of Patents and Trademarks*